(12) United States Patent
Wei

(10) Patent No.: US 6,295,871 B1
(45) Date of Patent: Oct. 2, 2001

(54) VIBRATION SENSING DEVICE

(76) Inventor: Jung-Tsung Wei, No. 76, Section 2, Tong-Man Road, Tainan City (TW)

( * ) Notice: Subject to any disclaimer, the term of this patent is extended or adjusted under 35 U.S.C. 154(b) by 0 days.

(21) Appl. No.: 09/580,402

(22) Filed: May 30, 2000

(51) Int. Cl.[7] .......................... G01N 24/00; H01H 35/02
(52) U.S. Cl. .............................. 73/570; 73/652; 73/654; 200/61.45 R; 200/51
(58) Field of Search .......................... 73/570, 652, 654; 200/61.45 R, 61.51

(56) References Cited

U.S. PATENT DOCUMENTS

| | | | |
|---|---|---|---|
| 3,617,664 | * 11/1971 | Tetrault | 200/61.51 |
| 4,042,796 | * 8/1977 | Zink | 200/61.45 R |
| 4,751,353 | * 6/1988 | Stephens | 200/277 |
| 5,153,566 | * 10/1992 | Yun | 200/61.45 R |
| 5,826,568 | * 10/1998 | Van Ross, Jr. | 124/6 |

* cited by examiner

*Primary Examiner*—Hezron Williams
*Assistant Examiner*—Jacques M. Saint-Surin
(74) *Attorney, Agent, or Firm*—Rosenberg, Klein & Lee

(57) ABSTRACT

A vibration sensing device has a spherical shell, an insulating cushion inserted in a top portion of the spherical shell, a conductive probe rod passing through the insulating cushion, a conductive thread connected to an end of the conductive probe rod, and a conductive plumb ball connected to the conductive thread. A conductive free ball is disposed in the spherical shell.

5 Claims, 8 Drawing Sheets

VIBRATION SENSING DEVICE

BACKGROUND OF THE INVENTION

The present invention relates to a vibration sensing device. More particularly, the present invention relates to a vibration sensing device which has a high sensitive function.

Most conventional vibration sensing devices have complex structures. One types of the conventional vibration sensing devices has a mechanical vibration sensing structure. The second type of the conventional vibration sensing devices has a resistance vibration sensing structure. The third types of the conventional vibration sensing devices has a magnetic vibration sensing structure.

SUMMARY OF THE INVENTION

An object of the present invention is to provide a vibration sensing device which has a plumb ball to contact a free ball in order to conduct electrically or not to contact the free ball in order to discontinue an electrical conduction.

Another object of the present invention is to provide a vibration sensing device which has a thread and a length of the thread can be adjusted so that various sensitivities can be obtained.

In accordance with a first preferred embodiment the represent invention, a vibration sensing device comprises a spherical shell, an insulating cushion inserted in a top portion of the spherical shell, a conductive probe rod passing through the insulating cushion, a conductive thread connected to an end of the conductive probe rod, and a conductive plumb ball connected to the conductive thread. A conductive free ball is disposed in the spherical shell.

In accordance with a second preferred embodiment of the present invention, a vibration sensing device comprises a spherical shell, an insulating cushion inserted in a top portion of the of the spherical shell, a screw rod passing through the insulating cushion, a conductive probe tube inserted in the inserted in the insulating cushion, a conductive thread connected to an end of the screw rod, and a conductive plumb ball connected to the conductive thread. A nut fastens an upper end of the screw rod. The conductive probe tube has a channel. The conductive thread passes through the channel of the conductive probe tube. A conductive free ball is disposed in the spherical shell.

In accordance with a second preferred embodiment of the present invention, a vibration sensing device comprises a semispherical shell, a cover covering the semispherical shell, a channel formed in a center portion of the cover, a screw rod passing through the channel, a conductive thread connected to an end of the screw rod, and a conductive plumb ball connected to the conductive thread. A nut fastens an upper end of the screw rod. A conductive free ball is disposed in the semispherical shell.

DETAILED DESCRIPTION OF THE INVENTION

Figure 1:
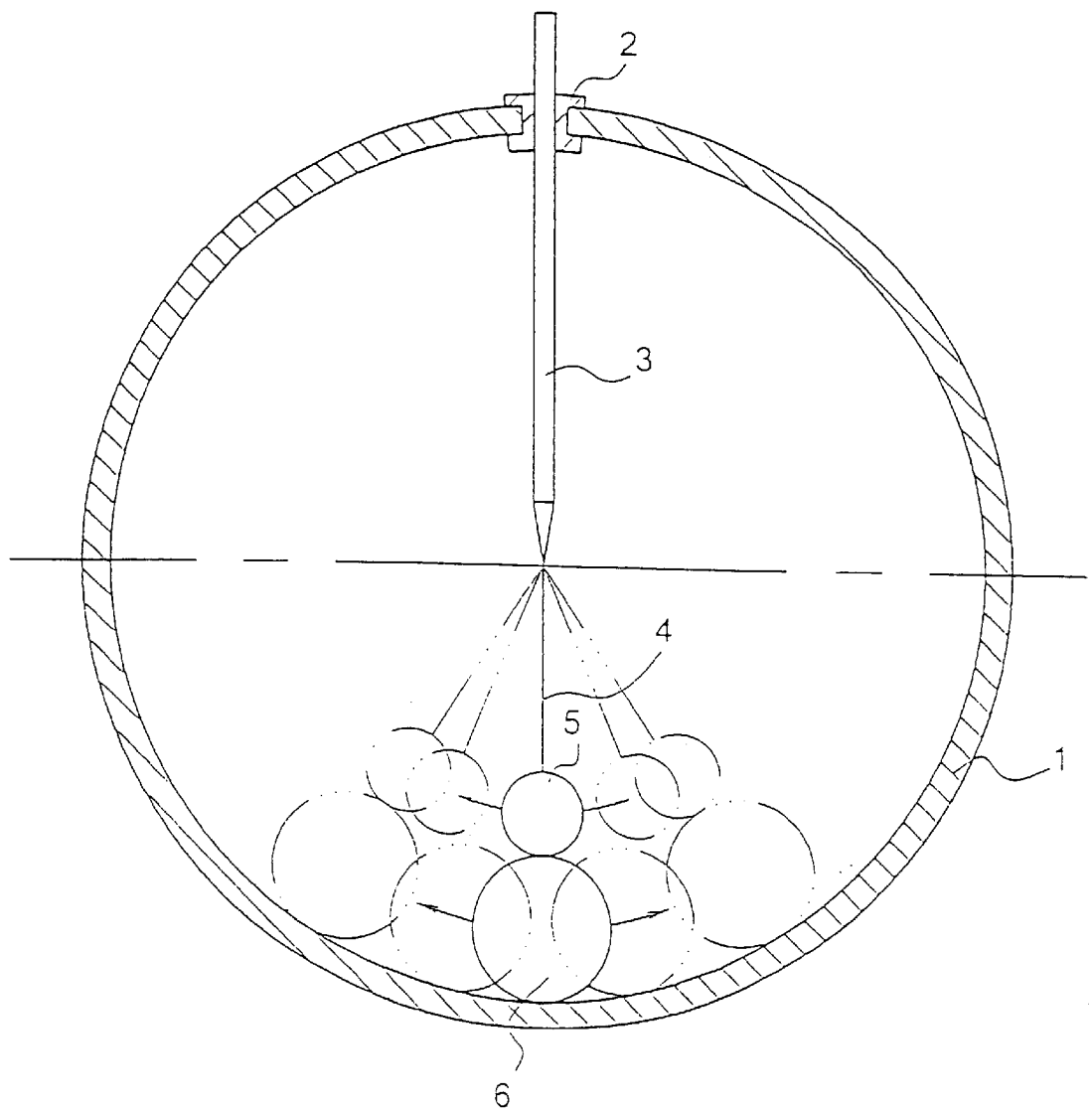
FIG. 1 is a sectional schematic view of a vibration sensing device of a first preferred embodiment in accordance with the present invention.

Referring to FIG. 1, a first vibration sensing device comprises a spherical shell 1, an insulating cushion 2 inserted in a top portion of the spherical shell 1, a conductive probe rod 3 passing through the insulating cushion 2, a conductive thread 4 connected to an end of the conductive probe rod 3, and a conductive plumb ball 5 connected to the conductive thread 4.

A conductive free ball 6 is disposed in the spherical shell 1. When the conductive free ball 6 does not rotate and vibrate, the conductive plumb ball 5 contacts the conductive free ball 6.

Figure 2:
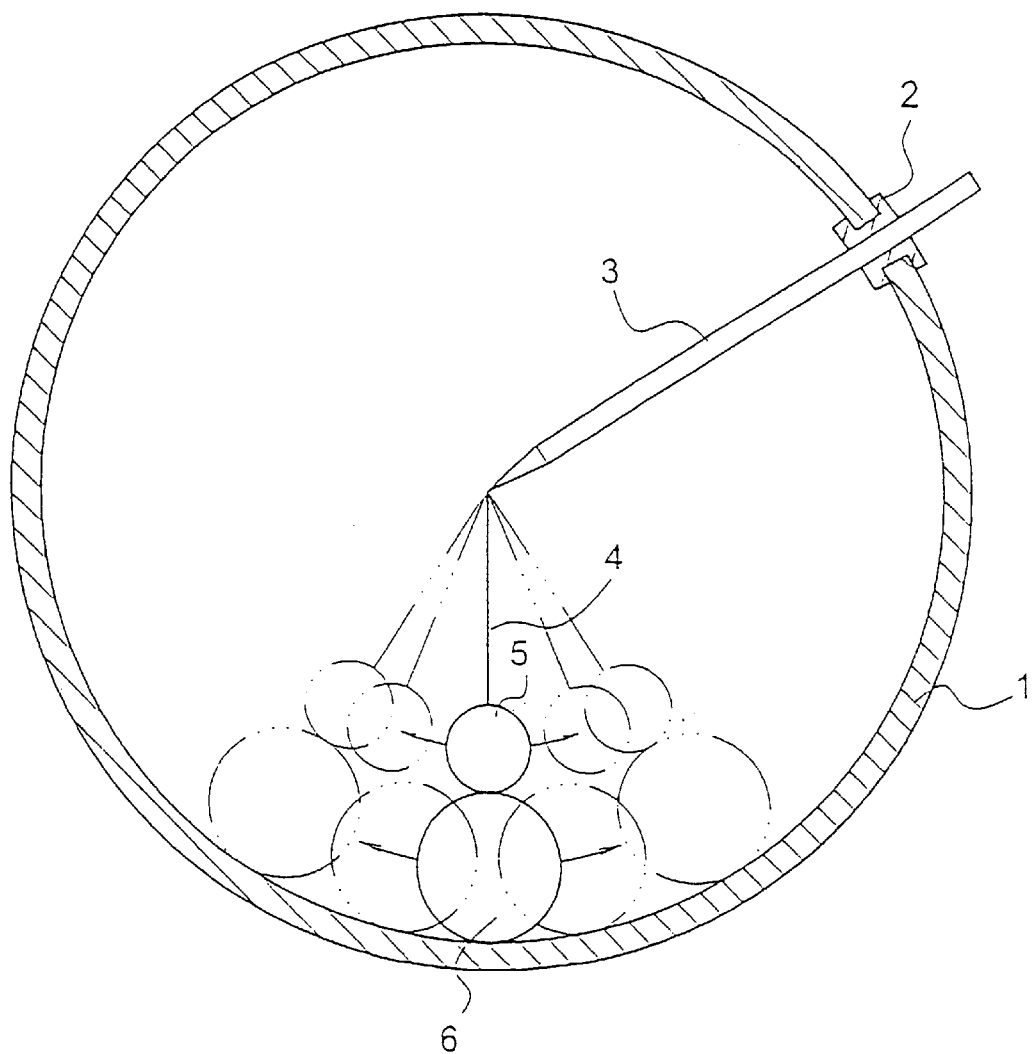
FIG. 2 is a sectional schematic view of a vibration sensing device of a first preferred embodiment while a probe rod is not in a perpendicular position.

Referring to FIG. 2, the conductive thread 4 is in a perpendicular position while the probe rod 3 is not in a perpendicular position.

Figure 6:
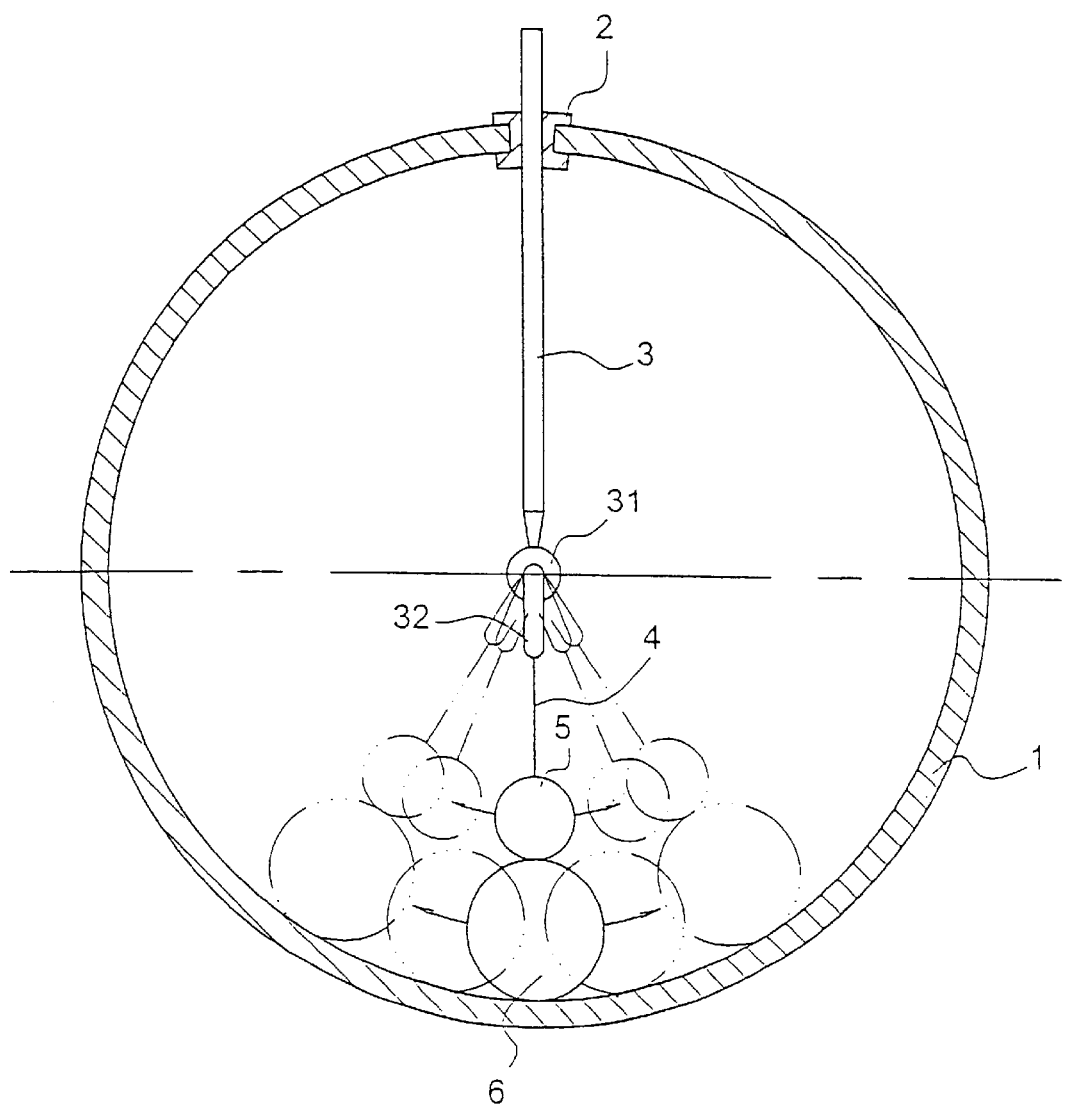
FIG. 6 is a sectional schematic view of a vibration sensing device of a fourth preferred embodiment in accordance with the present invention.

Referring to FIG. 6, the vibration sensing device further comprises an upper ring 31 and a lower ring 32 disposed on a lower end of the conductive probe rod 3. The conductive thread 4 is connected to an end of the lower ring 32.

Figure 3:
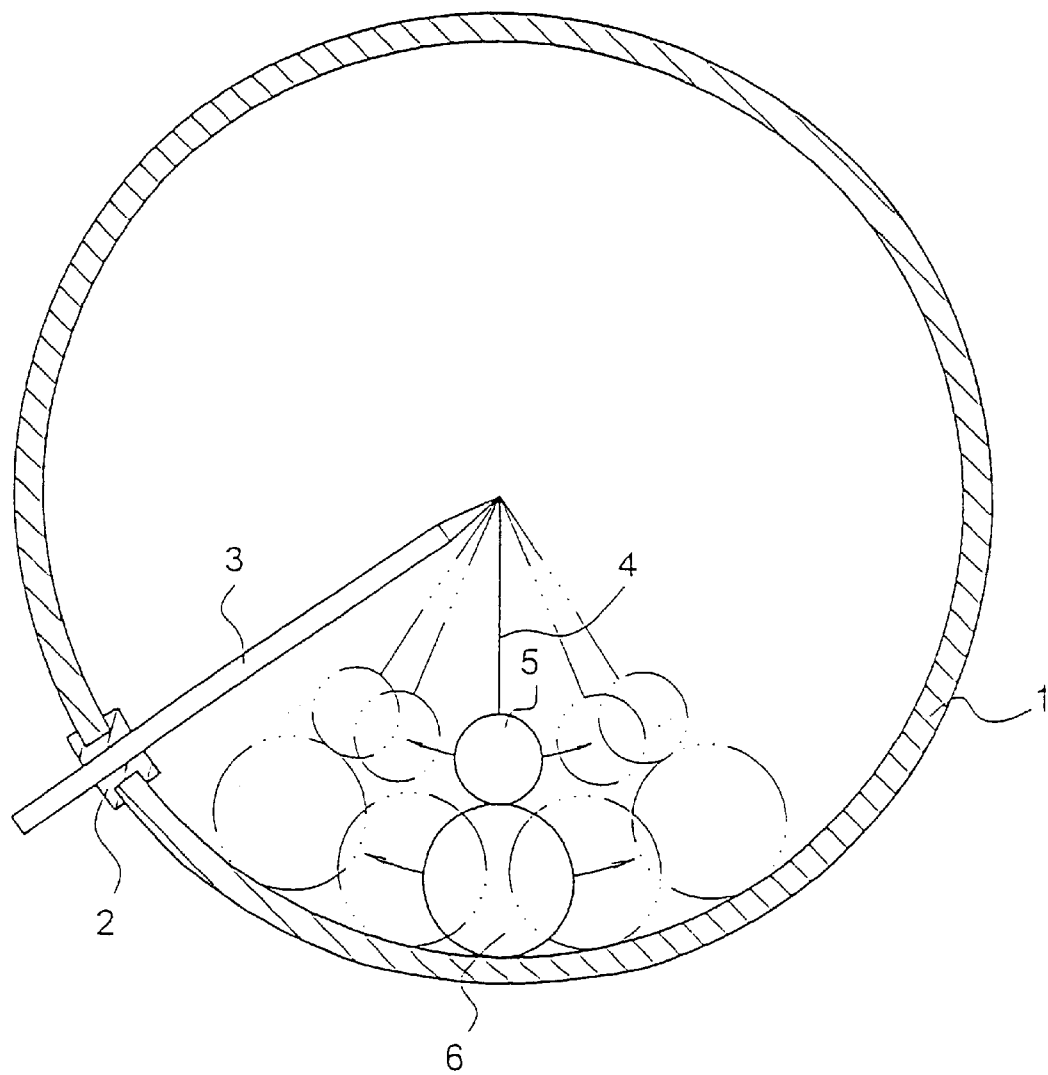
FIG. 3 is another sectional schematic view of a vibration sensing device of a first preferred embodiment while a probe rod is not in a perpendicular position.

Referring to FIG. 3, the conductive thread 4 is in a perpendicular position while the probe rod 3 is not in a perpendicular position.

Figure 4:
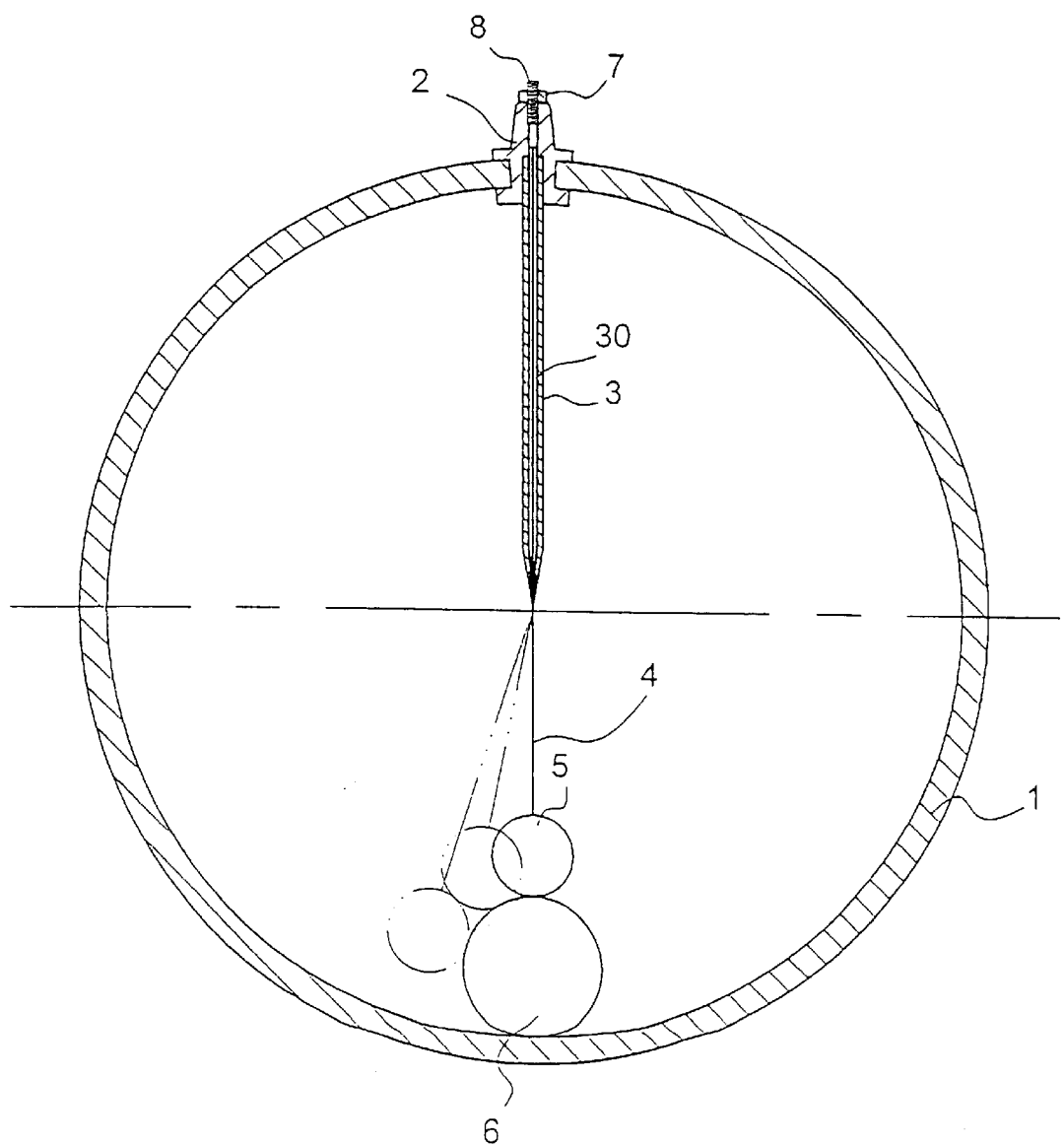
FIG. 4 is a sectional schematic view of a vibration sensing device of a second preferred embodiment in accordance with the present invention.

Referring to FIG. 4, a second vibration sensing device comprises a spherical shell 1, an insulating cushion 2 inserted in a top portion of the spherical shell 1, a screw rod 8 passing through the insulating cushion 2, a conductive probe tube 3 inserted in the insulating cushion 2, a conductive thread 4 connected to an end of the screw rod 8, and a conductive plumb ball 5 connected to the conductive thread 4.

A nut 7 fastens an upper end of the screw rod 8.

The conductive probe tube 3 has a channel 30. The conductive thread 4 passes through the channel 30 of the conductive probe tube 3.

A conductive free ball 6 is disposed in the spherical shell 1. When the conductive free ball 6 does not rotate and vibrate, the conductive plumb ball 5 contacts the conductive free ball 6.

When the nut 7 is loosened, the length of the screw rod 8 can be adjusted.

Figure 5:
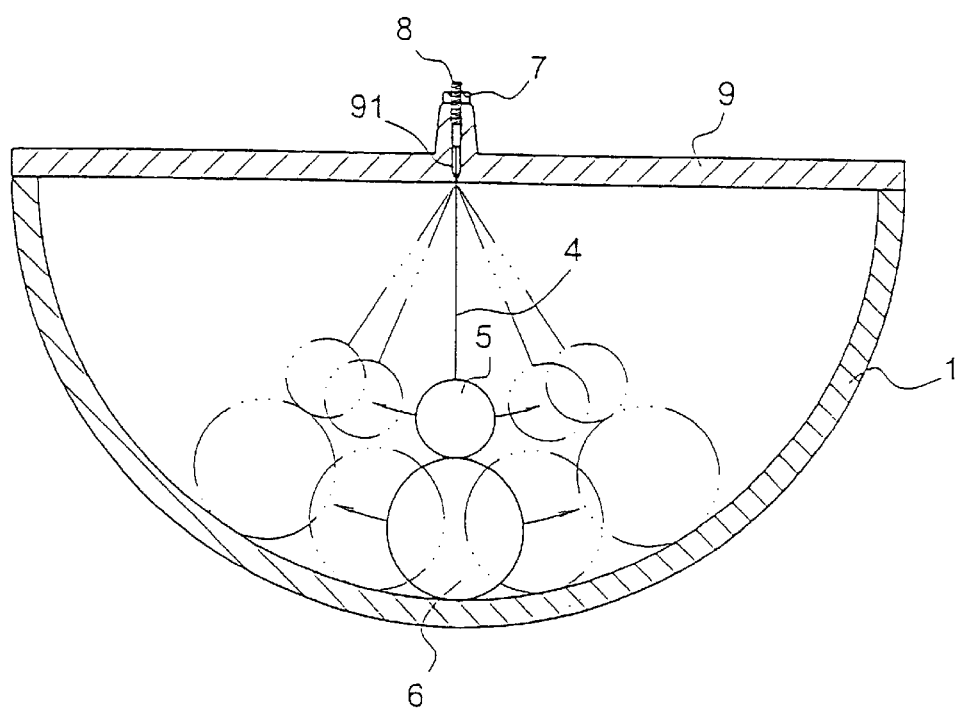
FIG. 5 is a sectional schematic view of a vibration sensing device of a third preferred embodiment in accordance with the present invention.

Referring to FIG. 5, a third vibration sensing device comprises a semispherical shell 1, a cover 9 covering the semispherical shell 1, a channel 91 formed in a center portion of the cover 9, a screw rod 8 passing through the channel 91, a conductive thread 4 connected to an end of the screw rod 8, and a conductive plumb ball 5 connected to the conductive thread 4.

A nut 7 fastens an upper end of the screw rod 8.

A conductive free ball 6 is disposed in the semispherical shell 1. When the conductive free ball 6 does not rotate and vibrate, the conductive plumb ball 5 contacts the conductive free ball 6.

When the nut 7 is loosened, the length of the screw rod 8 can be adjusted.

Figure 8:
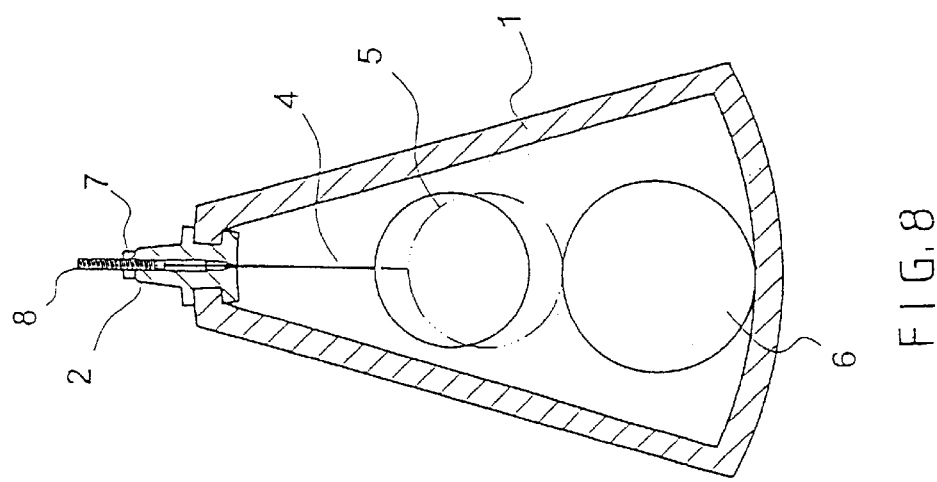
FIG. 8 is another sectional schematic view of a vibration sensing device of a fifth preferred embodiment in accordance with the present invention.
Figure 7:
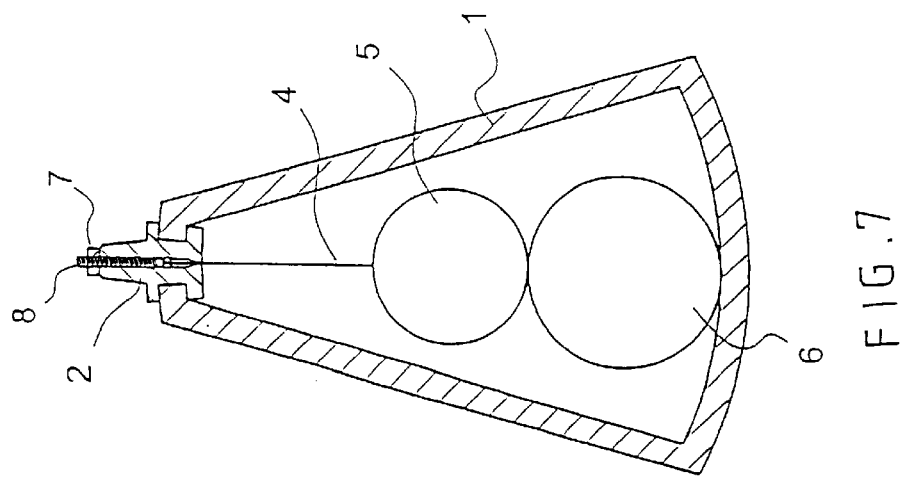
FIG. 7 is a sectional schematic view of a vibration sensing device of a fifth preferred embodiment in accordance with the present invention.

Referring to FIGS. 7 and 8, the shell 1 is in a bell shape.

Figure 9:
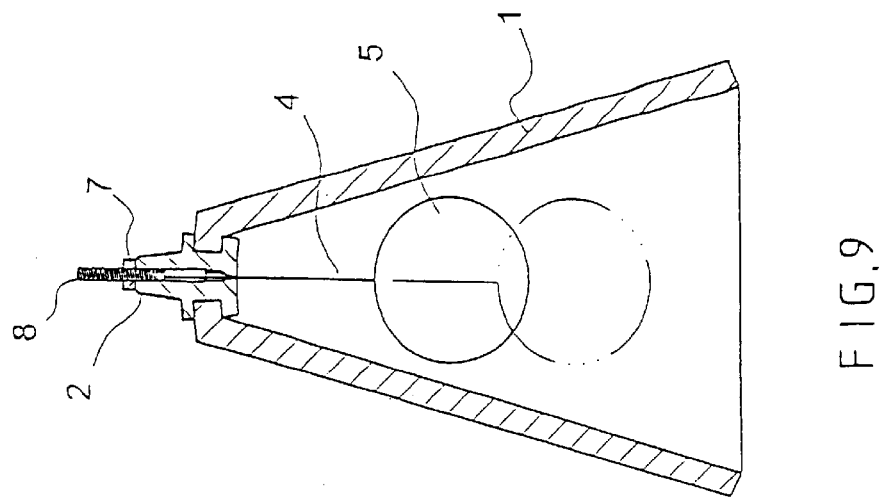
FIG. 9 is a sectional schematic view of a vibration sensing device of a sixth preferred embodiment in accordance with the present invention.

Referring to FIG. 9, the shell 1 is in a conical shape. The conductive free ball 6 is removed.

Figure 10:
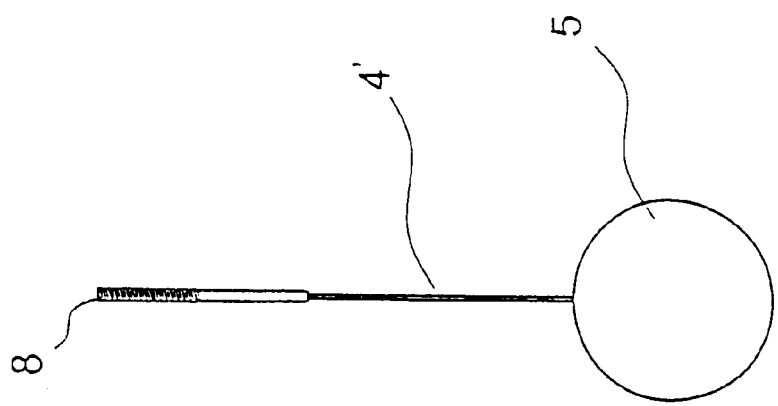
FIG. 10 is an elevational view of a plumb ball, an elastic rod, and a screw rod of a seventh preferred embodiment in accordance with the present invention.

Referring to FIG. 10, an elastic rod 4' replaces the conductive thread 4.

Figure 11:
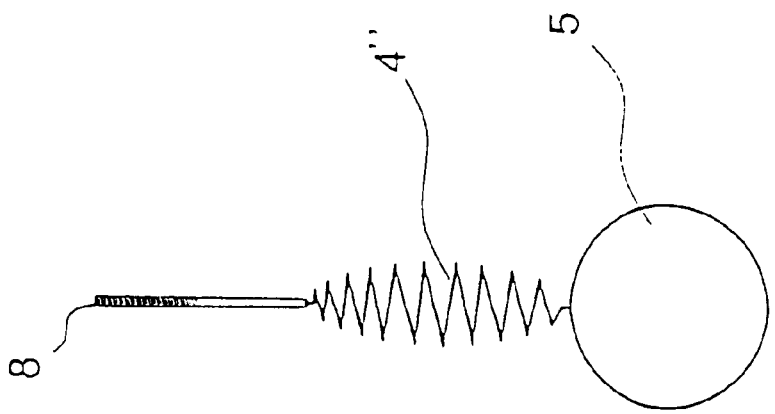
FIG. 11 is an elevational view of a plumb ball, an elastic spring, and a screw rod of an eighth preferred embodiment in accordance with the present invention.

Referring to FIG. 11, an elastic spring 4" replaces the conductive thread 4.

The invention is not limited to the above embodiment but various modification thereof may be made. Further, various changes in form and detail may be made without departing from the scope of the invention.

I claim:

1. A vibration sensing device comprising:

a shell;

an insulating cushion inserted in a top potion of the shell, a conductive thread connected to an end of a conductive probe rod, a conductive plumb ball connected to the conductive thread which is straightened upright by the conductive plumb ball, and a conductive free ball rotatably disposed in the shell and the conductive plumb ball contacting the free ball.

2. The vibration sensing device as claimed in claim 1, wherein the shell is in a spherical shape.

3. The vibration sensing device as claimed in claim 1, wherein the shell is in a conical shape.

4. A vibration sensing device comprising:

a spherical shell;

an insulating cushion inserted in a top portion of the spherical shell, a screw rod passing through the insulating cushion, a conductive probe tube inserted in the insulating cushion, a conductive thread connected to an end of the screw rod, a conductive plumb ball connected to the conductive thread which is straightened upright by the conductive plumb ball, a nut fastening an upper end of the screw rod, the conductive probe tube having a channel, the conductive thread passing through the channel of the conductive probe tube, and a conductive free ball rotatably disposed in the spherical shell and the conductive plumb ball contacting the free ball.

5. A vibration sensing device comprising:

a semispherical shell, a cover covering the semispherical shell, a channel formed in a center portion of the cover, a screw rod passing through the channel, a conductive thread connected to an end of the screw rod, a conductive plumb ball connected to the conductive thread which is straightened upright by the conductive plumb ball, a nut fstening an upper end of the screw rod, and a conductive free ball rotatably disposed in the semispherical shell and the conductive plumb ball contacting the free ball.

* * * * *